United States Patent [19]

Bhagavatula

[11] Patent Number: 4,804,248

[45] Date of Patent: Feb. 14, 1989

[54] DATA RATE LIMITER FOR OPTICAL TRANSMISSION SYSTEM

[75] Inventor: Venkata A. Bhagavatula, Big Flats, N.Y.

[73] Assignee: Corning Glass Works, Corning, N.Y.

[21] Appl. No.: 945,021

[22] Filed: Dec. 22, 1986

[51] Int. Cl.$^4$ .............................................. G02B 6/26
[52] U.S. Cl. .................................... 350/96.15; 65/4.2
[58] Field of Search ........................ 350/96.15, 96.16; 65/4.1, 4.2, 4.21; 455/612

[56] References Cited

U.S. PATENT DOCUMENTS 3,969,016  7/1976  Kaiser et al. ..................... 350/96.15
4,641,914  2/1987  Sheen ............................... 350/96.15

FOREIGN PATENT DOCUMENTS

54450     5/1977  Japan ................................ 350/96.15
29847     3/1980  Japan ................................ 350/96.15
1183744   3/1970  United Kingdom ............... 65/4.2
2040493   8/1980  United Kingdom ............... 350/96.15

Primary Examiner—James B. Mullins
Attorney, Agent, or Firm—William J. Simmons, Jr.

[57] ABSTRACT

A single-mode transmission optical fiber may have a bandwidth much greater than that necessary to transmit a desired predetermined maximum data rate. The single-mode fiber is connected to a bandwidth limiting device comprising the serial combination of an input optical fiber, a mode converter and multimode fiber. If the multimode fiber is capable of propagating two modes, for example, the mode converter converts the LP01 signal from the transmission fiber to the LP01 and LP11 modes. These two modes propagate at different speeds through the multimode fiber. Means connected to the output end of the multimode fiber detects the two modes. If the time delay difference Δt between the two modes is small with respect to the width of a pulse in the transmitted pulse train, the pulse train will be detected without distortion. Transmission at a higher data rate causes Δt to be large with respect to pulse width. Thus, a transmitted pulse causes the generation of a false pulse, whereby operation at the higher data rate is impossible. Also disclosed are methods of making suitable mode converters.

37 Claims, 3 Drawing Sheets

DATA RATE LIMITER FOR OPTICAL TRANSMISSION SYSTEM

BACKGROUND OF THE INVENTION

The present invention relates to optical fiber transmission systems and more particularly to a device for introducing dispersion into such a system to limit its bandwidth or information carrying capacity.

It is sometimes desirable to limit the capacity of an optical transmission system to some predetermined maximum data rate. For example, a customer may purchase the sole use of a single-mode optical fiber transmission line and connect its own terminal equipment thereto. The price of using the transmission line may be based on the maximum data rate that the customer intends to transmit. The bandwidth of the single-mode fiber transmission line may be much greater than that currently needed by the customer.

The bandwidth of such a system can be limited by inserting a suitable device in series with the transmission medium. In addition to limiting the bit rate, the device should possess some or all of the following attributes. It should not degrade the performance of the system at bit rates up to the set limit of the agreed upon bit rate. The insertion loss should be as small as possible. The device should be relatively insensitive to system length and wavelength. In addition, it should be simple and inexpensive to make and use.

Some proposed active devices include those which monitor the bit rate and render the system inoperable if the bit rate exceeds the maximum permissible rate. These active devices are complex and expensive.

Two relatively simple passive devices employ power splitters that branch off a portion of the bit power and reintroduce it with a predetermined delay. The splitter technique suffers from the disadvantage of wavelength dependence. Also, repeated coupling of progressively smaller amplitude pulses induced by the splitter at multiples of the primary delay time, may cause problems.

A passive data rate limiter is disclosed in U.S. patent application Ser. No. 894,576, filed Aug. 8, 1986 for "Data Rate Limiter for Optical Transmission System" (D. Charlton). The transmitted signal is connected to wavelength disperser means which spatially separates the different wavelength components of the transmitted signal. Each wavelength component is then propagated with a different delay by optical fiber delay means. The wavelength component which propagates with the least delay through the transmission optical fiber is subjected to the least induced delay in the optical fiber delay means and that which propagates with the greatest delay through the transmission optical fiber is subjected to the greatest induced delay in optical fiber delay means, the remaining components being subjected to intermediate delays. The delayed wavelength components are combined to form a series of broadened optical pulses. That device lacks simplicity and is wavelength dependent.

SUMMARY OF THE INVENTION

It is therefore an object of the invention to provide a data rate limiter which possesses low insertion loss, is simple to implement and is operational over a wide band of wavelengths. Another object is to provide a data rate limiter which subjects the transmission system to minimal dispersion penalty at bit rates up to the rate set by the limiter.

The bandwidth limiter of the present invention comprises a multimode optical fiber for propagating a plurality of modes at different velocities, and means for receiving input light. First transition means is located at the first end of the multimode fiber for redistributing energy received by the receiving means and initiating in the multimode fiber the propagation of a plurality of modes which propagate therethrough at different velocities. The reception by the receiving means of a given pulse of light energy having a given width results in the arrival at the second end of the multimode fiber of a plurality of modes, the summation of which would be a light pulse having a width which is greater than the given width by a time interval that is equal to the differential delay time between the slowest and the fastest propagating modes in the multimode fiber. Second transition means can be located at the second end of the multimode fiber for converting a portion of the energy in each mode that propagates in the multimode fiber, except the LP01 mode, into at least one lower order mode.

In one embodiment the means for receiving input light is an optical fiber that is capable of transmitting fewer modes than the multimode optical fiber. This input optical fiber is preferably a single-mode fiber.

The mode converter for the present invention can be formed by providing an optical fiber comprising two adjacent sections. The junction between the two sections is heated and the sections are bent at the junction so that the longitudinal axis of one of the fiber sections is angularly offset with respect to the other fiber section. The method can also comprise the step of laterally moving the longitudinal axes of the fiber sections with respect to each other.

The method can further comprise the steps of connecting a source of light pulses to one of the fiber sections and monitoring the light pulses emitted from the remaining fiber section. The step of bending is continued until the step of monitoring reveals that the power levels of at least two modes propagating in one of the fiber sections are at a predetermined ratio.

DETAILED DESCRIPTION

Figure 1:
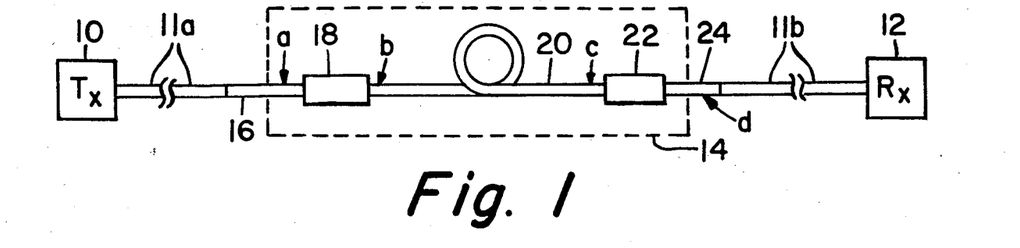
FIG. 1 is a schematic illustration of the optical pulse broadening system of the present invention.

Telephone companies sometimes provide a customer with a "dark fiber", i.e. an optical fiber having no terminal equipment. Optical fiber transmission line sections 11a and 11b of FIG. 1 are representative of such a fiber. In a conventional system, sections 11a and 11b are connected by a fusion joint, a connector or a signal repeater. Obviously, many other optical transmission line sections may be connected serially with sections 11a and 11b in order to interconnect two remote stations. The customer may initially intend to connect to the ends of the optical transmission line a particular transmitter 10 and a particular receiver 12. With such terminal equipment, the customer may presently have the capability of transmitting data at a predetermined maximum data rate and may desire to be billed at a rate which depends upon that predetermined maximum data rate. The optical fiber transmission line may be a fiber having a bandwidth capable of transmitting information at a rate much greater than the predetermined maximum rate. Examples of high bandwidth fibers are single-mode, few mode and graded index multimode fibers. Since the terminal equipment is under the control of the customer, that terminal equipment could be upgraded by the customer so that the system would transmit information at a rate greater than the predetermined rate. However, if the telephone company had no knowledge of the change in terminal equipment, the customer could transmit information over the fiber at the higher rate while continuing to pay the lower price for using the fiber.

This situation can be avoided by limiting the system bandwidth to a value such that the maximum data rate that can be transmitted is that for which the customer has paid. Bandwidth limiting device 14 of FIG. 1 can be employed to effect such a result. Device 14 comprises an input optical fiber 16, a mode converter 18 and a multimode bandwidth limiter fiber 20. If the output of device 14 is to be connected to a fiber 11b which propagates fewer modes than fiber 20, a second mode converter 22 and an output optical fiber 24 are employed.

Input fiber 16 and output fiber 24 should be selected to be compatable with transmission fibers 11a and 11b. Fibers 16 and 24 may be single-mode fibers if fibers 11a and 11b are single-mode fibers. However, some other design criteria may be paramount. For example, it may be advantageous to form fiber 16 from an end region of fiber 20. An example of such a design is described below.

The function of the input and output mode converters is to (1) initiate in an optical fiber the propagation of a number of modes which is greater than the number of modes which an input signal would otherwise induce in such fiber or (2) redistribute the power propagating in a given number of modes. These functions will be described in greater detail below.

Figure 2:
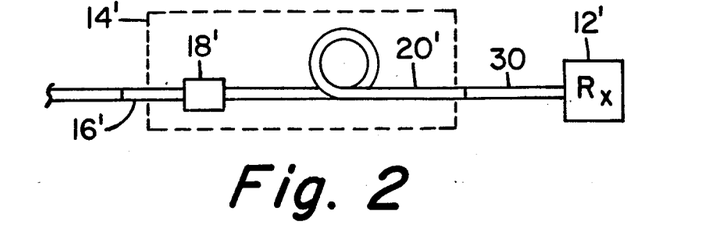
FIGS. 2 and 3 are schematic illustrations of modifications of the embodiment of FIG. 1.
Figure 3:
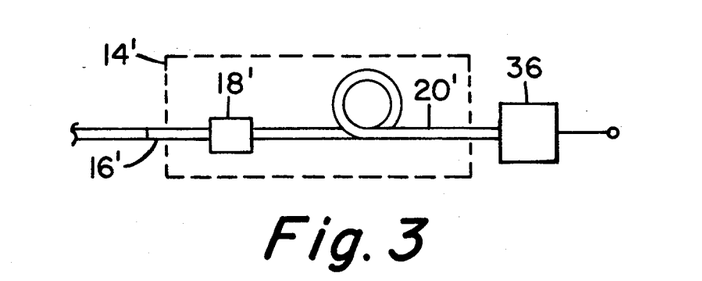

The output mode converter is not needed in the embodiments of FIGS. 2 and 3, wherein elements similar to those of FIG. 1 are represented by primed reference numerals. As shown in FIG. 2, the output endface of multimode fiber 20' is directly connected to a multimode fiber 30 having a mode volume equal to or greater than that of fiber 20'. In the embodiment of FIG. 3, the output of multimode fiber 20' is directly connected to a photo detector 36 which converts the modes propagating in fiber 20' into an electrical signal.

The embodiments of FIGS. 2 and 3 have the following disadvantages as compared with that of FIG. 1. If the length of multimode fiber 30 of FIG. 2 is appreciable, it will introduce dispersion into the system which will limit the bit rate to which the system can eventually be upgraded. In the embodiment of FIG. 3, the device 14' must be located at the output end of the optical transmission system where it may be under the control of the customer.

Figure 4:
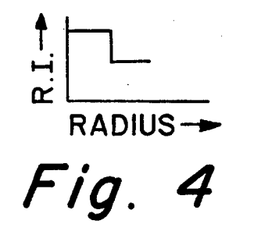
FIGS. 4 and 5 are curves illustrating two of the refractive index distributions which may be utilized in the bandwidth limiting fiber of FIG. 1.
Figure 5:
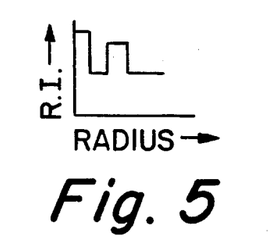

Multimode fiber 20 should be one wherein the differential mode delay between the highest and lowest order modes propagating therein is relatively great. Two of the many possible suitable fibers are a step-index fiber (FIG. 4) and a multi-core fiber (FIG. 5). The meridional mode which propagates at low angles along the axis of a step-index fiber experiences less delay than a skew ray which does not. Since the skew ray continually reflects from the core-clad interface, its delay time in the multimode fiber is greater than that of the meridional ray.

As disclosed in U.S. Pat. No. 4,000,416 a multi-core fiber can comprise a central core and one or more concentric light-propagating regions which are optically isolated from one another by annular cladding regions. The propagation characteristics of the different cores can be made sufficiently different that light propagating in each of the core regions of the fiber experiences a different delay.

Examples of mode converters which may be employed in the devices of FIGS. 1, 2 and 3 are (1) lateral and angular misalignment between two fiber sections (2) a short tapered region between two fibers that are laterally and angularly misaligned, (3) a tapered fiber, (4) a spherical ball lens, and (5) periodic perturbation. Type (1) can consist of two different fibers spliced together or a single piece of multimode fiber having a sharp bend or kink therein. Discussed below are various methods for making type (1), type (2) mode and type (5) converters.

EXAMPLE 1

Figure 6:
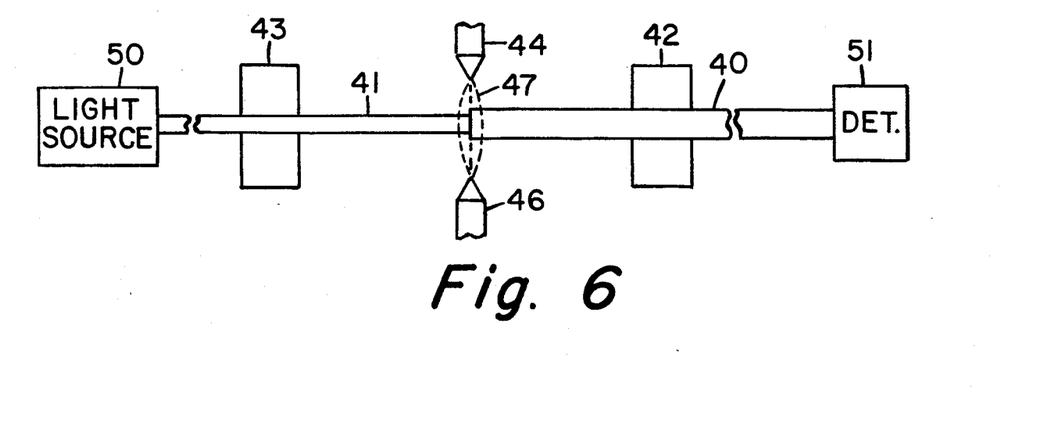
FIGS. 6 and 7 illustrate steps in the process of making a bandwidth limiting device for use in the system of FIG. 1.
Figures 7, 8, 9:
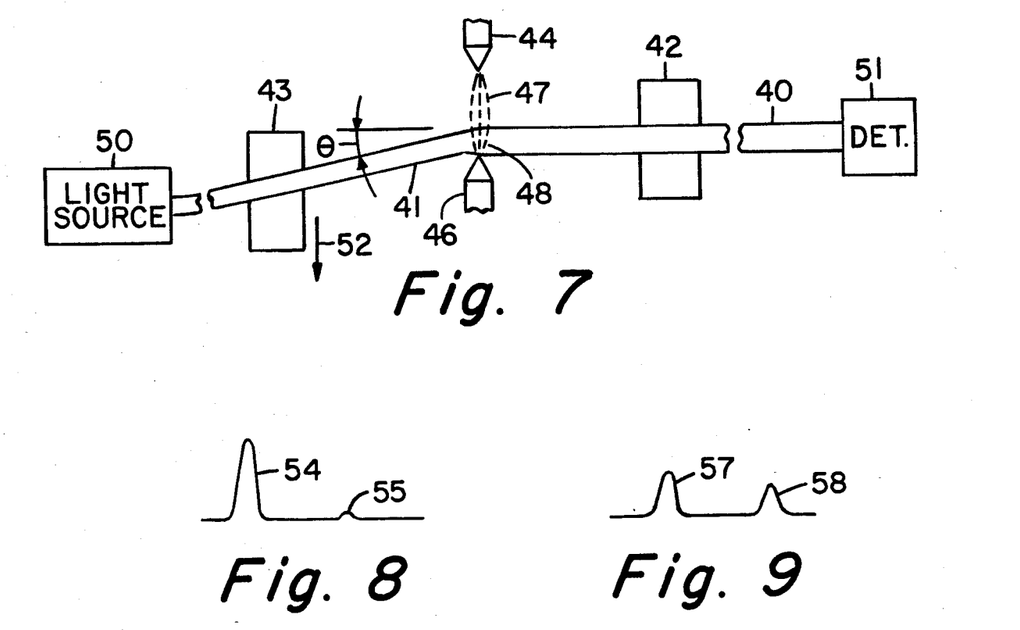
FIGS. 8, 9 and 10 are pulse shapes that appear at the detector of FIGS. 6 and 7 during the manufacturing process.

FIGS. 6 and 7 illustrate a method of making the above-listed type (2) mode converter. These figures schematically illustrate a top view of a fiber splicing apparatus similar to that disclosed in U.S. Pat. No. 4,049,414. It is assumed in this example that device 14 of FIG. 1 will be utilized in an optical transmission system that is to be operated at a bit rate of 90 Mb/sec. A differential delay of 4.5 ns is therefore required.

Referring to FIG. 6, a section 40 of step index two-mode fiber is cut to a length of 2.8 km that is sufficient to provide the desired differential mode delay. A single-mode step index fiber is cut to a length 41 suitable for coupling purposes, eg. about 1–2 m. The outer diameters of fibers 40 and 41 are 210 $\mu$m and 125 $\mu$m, respectively, and their core diameters are 15 $\mu$m and 9 $\mu$m, respectively. Both fibers have $GeO_2$-doped $SiO_2$ cores and $SiO_2$ cladding. The cores contain a sufficient amount of $GeO_2$ to provide a $\Delta$ of 0.3%. Using standard procedures for making good splices, the fiber endfaces to be joined are cleaved and cleaned. Fibers 40 and 41 are secured near their ends to x—y—z positioners 42 and 43, respectively, by vacuum chucks. Positioners 42 and 43 are manipulated to position fibers 40 and 41 in axial alignment, their abutting endfaces being about midway between electrodes 44 and 46. A source 50 of short optical pulses, which is connected to input fiber 41, initiates therein the propagation of a single-mode (LP01) signal. This signal is coupled to and propagates through multimode fiber 40 to detector/oscilloscope 51. The train of short optical pulses appears on the oscilloscope as pulse 54 of FIG. 8. Axial alignment of fibers 40 and 41 can be ascertained by observing peak power propagation between the fibers, i.e. by maximizing the amplitude of pulse 54. One of the fibers is then laterally offset about 5 μm with respect to the other.

An arc 47 is generated between electrodes 44 and 46 to fuse the adjacent endfaces in a known manner. Both of the positioners are moved about 100 μm away from the plane of electrodes 44 and 46 to form a short tapered region 48, which is shown in FIG. 7. It is noted that this taper would not be necessary if fibers 40 and 41 had the same outside diameter. At this stage of the process, the almost unperceptible blip 55 is evidence of the occurrence of a very small amount of coupling to the LP11 mode at taper 48 where the fiber axes are laterally offset. The differential delay between the propagation of the LP01 and LP11 modes through fiber 40 causes blip 55 to appear at the right of pulse 54.

Positioners 42 and 43 are moved laterally in direction 52 until tapered region 48 contacts electrode 46. Electrodes 44 and 46 are again energized, and the resultant arc 47 softens tapered region 48. Positioner 43 is then slowly moved in direction 52 to form a sharp bend at tapered region 48. While positioner 43 is being moved in this manner, the output signal is observed on oscilloscope 51. As the bend angle $\theta$ increases, blip 55 begins to increase in amplitude, and the previously large amplitude LP01 pulse 54 begins to decrease in amplitude.

In one embodiment, about 50% of the LP01 power propagating in single-mode input fiber 41 continues to propagate in the LP01 mode in multimode fiber 40, and about 35% thereof converts to the LP11 mode which propagates in fiber 40. There is thus a 0.7 dB loss at this input mode converter. With this ratio of power propagating in the two modes, the amplitude of the delayed LP11 pulse is about 70% of the amplitude of the LP01 pulse. When this relationship between the pulse amplitudes is observed on oscilloscope 51 (see pulses 57 and 58 of FIG. 9), movement of positioner 43 ceases. When tapered region 48 cools, the composite of fibers 40 and 41 remains sharply bent at the angle $\theta_i$ that is necessary to achieve that mode conversion which results in a 0.7 pulse amplitude ratio between the LP11 and LP01 modes. The angle $\theta_i$ is about 3° for such a pulse amplitude ratio.

It is noted that moving fiber 41 in direction 52 can cause it to move laterally as well as angularly with respect to fiber 40. If this lateral movement is too great, the power coupled to the LP01 and LP11 modes decreases to less than 50% and 35%, respectively. Care must therefore be taken when performing this step.

Figure 10:
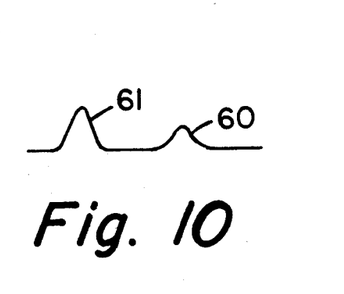

To form a mode converter at the remaining end of fiber 40, a 1–2 m section of single-mode fiber is butted against that end in the manner described in conjunction with FIG. 6. The detector/oscilloscope is connected to the output end of the single-mode fiber. The LP01 signal propagating in multimode fiber 40 also propagates in the single-mode output fiber, thereby generating on the oscilloscope a pulse similar to pulse 54 of FIG. 8. Axial alignment of the fibers is indicated by maximizing this pulse. One of the fibers is laterally offset about 5 μm, and the electrodes are energized to fuse the fiber endfaces. The lateral offset causes a blip similar to blip 55 to appear. This blip is indicative of a minute amount of mode conversion of the LP11 mode propagating in fiber 40 to the LP01 mode. Since the LP11 mode is delayed with respect to the LP01 mode in fiber 40, the blip appears to the right of the larger pulse. After the fused junction is elongated to form a tapered region a few hundred μm long, the tapered region is brought into contact with electrode 46. The single-mode fiber is moved laterally such that it forms an angle $\theta$ with respect to the multimode fiber. As the angle $\theta$ increases, a greater portion of the LP11 mode propagating in fiber 40 converts to the LP01 mode and propagates in the single-mode output fiber, and some of the LP01 mode converts to the LP11 mode. As shown in FIG. 10, the amplitude of the large pulse 61 has decreased and the amplitude of the blip has increased to that of pulse 60.

In one embodiment, about 50% of the LP01 power propagating in multimode fiber 40 continues to propagate in the single-mode output fiber. Also, about 35% of the LP11 power propagating in multimode fiber 40 converts to the LP01 mode and propagates in the single-mode output fiber. There is thus an approximate loss of 3.5 dB at this output mode converter. With this mode conversion and the previously mentioned mode conversion occurring at the junction of fibers 40 and 41, the amplitude of the delayed output pulse 60 is about 50% of the amplitude of the first occurring output pulse 61. When this relationship between the pulse amplitudes is observed on oscilloscope 51, lateral movement of the single-mode fiber ceases. The output single-mode fiber and multimode fiber 40 remain bent at an angle $\theta_o$ which is also about 3°. The resultant device is suitable for use as device 14 in FIG. 1.

It is noted that the lateral and angular offsets between the fibers have optimal values which depend upon the particular fibers employed and upon the desired power ratio of the modes generated at the mode converter.

EXAMPLE 2

Mode conversion can also be implemented in the multimode limiter fiber itself. The required length of multimode limiter fiber for providing the differential mode delays is determined, and a length of such fiber equal to the predetermined length plus about two meters is obtained. One meter at each end will function as the input and output fiber. A sharp bend is formed one meter from each end in the manner described in Example 1 to form bends having angles $\theta_i$ and $\theta_o$. No tapering is needed. The two adjacent fiber sections at each mode converter can also be laterally offset.

EXAMPLE 3

Figure 11:
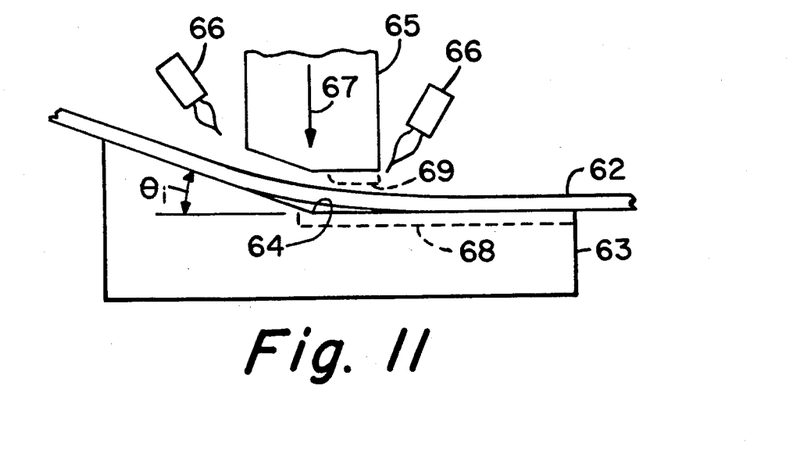
FIG. 11 illustrates an alternative method of making the bandwidth limiting device.

After the angles $\theta_i$ and $\theta_o$ have been determined for a particular type of multimode limiter fiber and a particular type of input and output fiber, apparatus illustrated in FIG. 11 may be employed to mass produce device 14 of FIG. 1. FIG. 11 illustrates an embodiment wherein a single multimode fiber functions as the limiter fiber as well as the input and output fibers. The required length of multimode limiter fiber for providing the differential mode delays plus two meters for the input and output fibers is obtained. If longer input and output fibers are desired, a correspondingly longer piece of multimode fiber is obtained. Multimode fiber 62 is placed on a template 63 having the desired sharp bend 64 that is necessary to effect mode conversion in the multimode fiber. The bottom surface of plunger 65 is provided with the predetermined sharp bend. After fiber 62 is placed on template 63, heat sources such as burners 66 direct heat onto that portion of fiber 62 which is situated at bend 64. Plunger 65 then moves in the direction of arrow 67 toward template 63 a distance sufficient to insure that fiber 62 has been provided with a kink at the predetermined angle $\theta_i$. For example, plunger 65 might stop moving toward template 63 when the distance therebetween is equal to the diameter of fiber 62. One meter from the opposite end a kink at the predetermined angle $\theta_o$ is similarly imparted to the multimode fiber.

To provide fiber 62 with a lateral offset as well as an angular offset, the right side of the upper surface of template 63 could be lowered to the level represented by dashed line 68, and the right side of plunger 65 could be extended as shown by dashed line 69.

EXAMPLE 4

Figure 12:
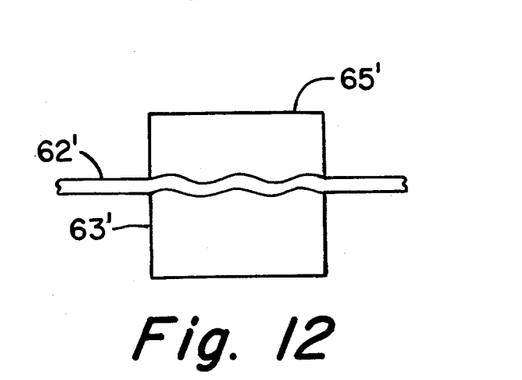
FIG. 12 illustrates apparatus for forming a periodic perturbation mode coupler.

Rather than being flat as shown in FIG. 11, the fiber engaging surfaces of plunger 65 and template 63 could be undulated in order to impart periodic perturbations to the fiber junction. As shown in FIG. 12, wherein elements similar to those of FIG. 11 are represented by primed reference numerals, a sharp bend is not needed in the perturbation-type mode coupler. After fiber 62' is heated, plunger 65' moves toward template 63' until it reaches the position shown in FIG. 12.

EXAMPLE 5

The apparatus of FIG. 11 could also be employed to impart a predetermined angular kink to the junction between two dissimilar fibers. The two fibers are first joined by a fusion splice, and the junction is tapered as described above. The fibers are placed on template 63 with the tapered section adjacent bend 64. The process then proceeds in the previously described manner.

Mode conversion can also be accomplished in an elongated tapered region, but such a mode converter may not be as effective as one formed by angular misalignment.

A periodic perturbation can be generated by varying the core index or diameter in a sinusoidal fashion. Such perturbation can be generated in the multimode fiber during its fabrication. A periodic perturbation can also be generated by pressing the fiber between two plates or gratings having proper periodicity. It may also be generated by active means such as an accousto-optic transducer.

A bandwidth limiting device formed in accordance with Example 1 could be employed in a conventional single-mode transmission system that is to be limited to a maximum bit rate of 90 Mb/sec. It is assumed that the single-mode transmission fiber has a sufficiently high bandwidth that pulse spreading during transmission is negligible. As indicated in Example 1, the multimode bandwidth limiter fiber is a 2.8 km section of two-mode fiber that provides a differential delay $\Delta\tau$ of 4.5 ns between the LP01 and LP11 modes.

Figure 13:
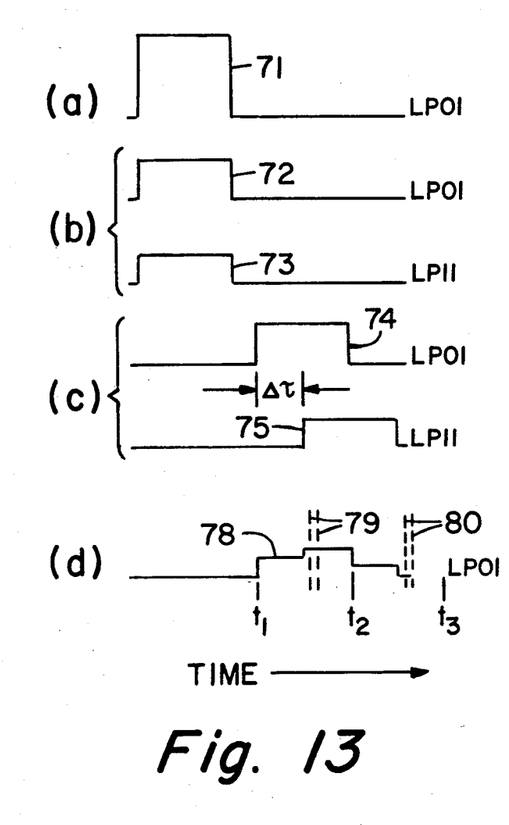
FIGS. 13 and 14 are pulse diagrams illustrating optical pulses propagating at various points in the system of FIG. 1 during the operation thereof.
Figure 14:
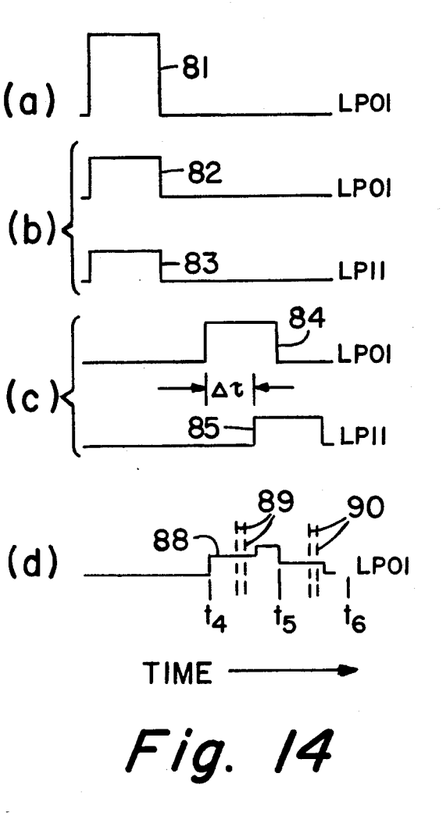

Reference will be made to FIGS. 13 and 14, portions (a) through (d) of which illustrate pulses appearing at points a through d of FIG. 1. FIG. 13 illustrates system operation at 90 Mb/s, whereas FIG. 14 illustrates operation at 135 Mb/s.

The particular bandwidth limiting device described above would function in the following manner in the system of FIG. 1. The time duration $\tau_{bit}$ of a pulse at the output end of transmission fiber 11b is about 1/Bit Rate. Assume that the maximum predetermined data rate for which a customer pays is 90 Mb/sec. The width of each pulse generated at the transmitter 10 is $1/90 \times 10^6$ sec or 11.1 ns. Since $\Delta\tau_{system}$ is negligible, the width of pulse 71 (FIG. 13) received by fiber 16 is 11.1 ns. Pulse 71, which propagates in the LP01 mode, is converted to LP01 pulse 72 and LP11 pulse 73, the amplitudes of which are about 50% and 35%, respectively, of that of pulse 71. Pulses 74 and 75 represent the delayed LP01 and LP11 pulses arriving at point c of FIG. 1. Since the LP11 mode experiences a greater delay, there is a differential delay time $\Delta\tau$ between the arrival times of pulses 74 and 75. The purpose of mode converter 22 is to convert a portion of pulse 75 to the LP01 mode so that it will propagate in single-mode fiber 24. About 35% of pulse 75 converts to the LP01 mode, and about 50% of pulse 74 continues to propagate in the LP01 mode, these two LP01 components combining to form pulse 78. Some of the remaining power in pulses 74 and 75 converts to the LP11 mode which cannot propagate in single-mode fibers 24 and 11b. Had pulse 78 not been extended by time period $\Delta\tau$, that pulse would have existed between times $t_1$ and $t_2$ and the following pulse from times $t_2$ to $t_3$. The time windows in which those two successive pulses would be detected are illustrated by dashed lines 79 and 80, respectively. The time lapse between time $t_2$ and the beginning of window 80 is about 5 ns. Thus, the pulse 78 could be about 4.5 ns broader than the originally propagated pulse without extending into window 80. Pulses can therefore be transmitted at a rate of 90 Mb/sec by a system employing the above-described bandwidth limiter 14.

If the customer attempts to upgrade the system to the next higher bit rate, i.e. 135 Mb/sec, operation of the system will be at least severely impaired. The width of each pulse generated at the 135 Mb/sec rate is 7.4 ns. Such a pulse 81 is shown in FIG. 14(a). In a manner similar to that described in conjunction with FIG. 13, propagation in the LP01 and LP11 modes is initiated by mode converter 18 as indicated by pulses 82 and 83. The LP11 pulse 85 arrives at the output end of multimode fiber 20 a time period $\Delta\tau$ after LP01 pulse 84. After the energy of pulses 84 and 85 is redistributed by mode converter 22, the resultant LP01 energy combines to form output pulse 88. Had pulse 88 not been extended by time period $\Delta\tau$, that pulse would have existed between times $t_4$ and $t_5$ and the following pulse between times $t_5$ and $t_6$. The time windows in which those two successive pulses would be detected are illustrated by dashed lines 89 and 90, respectively. At the 135 Mb/sec data rate, the time lapse between time $t_5$ and the beginning of window 90 is about 3 ns. Since bandwidth limiter 14 is designed for operation at 90 Mb/sec, it broadens pulse 81 by 4.5 ns, i.e. pulse 88 extends 4.5 ns beyond time $t_5$. Therefore, the 135 Mb/sec pulse 88 extends into the next detection window 90. This will cause the generation of a false pulse after each transmitted pulse.

It is noted that the length of the two-mode fiber could be substantially reduced if a multi-ring fiber of the type illustrated in FIG. 5 were employed. It is preferred that such multi-ring fibers be used for the multimode fiber 20 for low bit rate limiters, i.e. for limiters designed for systems operating at 90 or 135 Mb/sec. If the bit rate in the above example were 440 Mb/sec rather than 90 Mb/sec, the required length of the step index two-mode fiber would be less than 1 km.

By increasing the $\Delta$ of the multimode bandwidth limiter fiber, the $\Delta\tau$ per unit length increases, and the overall length requirements decrease. Also, a higher $\Delta$ would allow the formation of a smaller diameter reel of fiber.

I claim:

1. An optical fiber transmission system bandwidth limiter for operation at a given wavelength comprising
   a multimode optical fiber for propagating at said given wavelength a plurality of modes at different velocities, said multimode fiber having first and second ends,
   means for receiving input light,
   first transition means located at said first end of said multimode fiber for redistributing energy received by said receiving means and initiating in said multimode fiber for propagation of a plurality of modes which propagate therethrough at different velocities, whereby the reception by said receiving means of a given pulse of light energy having a given time duration width results in the arrival at said second end of said multimode fiber of a plurality of modes, the summation of which would be a light pulse having a width which is greater than said given width by a time interval that is equal to the differential delay time between the slowest and the fastest propagating modes in said multimode fiber, and
   second transition means at said second end of said multimode fiber for converting a portion of the energy in each mode that propagates in said multimode fiber, except the LP01 mode, into at least one lower order mode, whereby an LP01 mode light pulse propagating from said second transition means is broader than said given time duration because of the differences in the propagation times of various modes in said multimode fiber.

2. A bandwidth limiter in accordance with claim 1 wherein said multimode optical fiber is a two-mode fiber at said given wavelength.

3. A bandwidth limiter in accordance with claim 1 wherein said multimode fiber is a step-index fiber.

4. A bandwidth limiter in accordance with claim 1 wherein said multimode optical fiber comprises at least two annularly spaced, light propagating regions.

5. A bandwidth limiter in accordance with claim 1 wherein said means for receiving light is an input optical fiber that is joined to said multimode optical fiber, said input fiber being much shorter in length than said multimode optical fiber, said first transition means being constituted by a lateral offset and an angular offset between the longitudinal axes of said input and multimode fibers at the junction therebetween.

6. A bandwidth limiter in accordance with claim 5 wherein said multimode optical fiber and said means for receiving input light are adjacent sections of the same fiber.

7. A bandwidth limiter in accordance with claim 6 wherein said same fiber is a two-mode fiber at said given wavelength. reel of fiber.

8. A bandwidth limiter accordance with claim 1 wherein said second transition means comprises an output optical fiber joined to said multimode optical fiber, said multimode fiber being laterally and angularly offset with respect to said output fiber at the junction therebetween.

9. An optical fiber transmission system bandwidth limiter comprising
   a multimode optical fiber having first and second ends, an input optical fiber joined to the first end of said multimode fiber, and
   first transition means located at the junction of said input fiber and the first end of said multimode fiber for exciting in said multimode fiber a plurality of modes which is greater in number than the number of modes propagating in said input fiber, said multimode and input optical fibers being laterally and angularly offset with respect to each other at the junction therebetween, the propagation characteristics of said multimode fiber being such that said plurality of modes propagate therethrough at different velocities, whereby the reception by said input fiber of a given pulse of light energy having a given time duration width results in the arrival at said second end of said multimode fiber of a plurality of modes, the summation of which would be a light pulse having a width which is greater than said given width by a time interval that is equal to the differential delay time between the slowest and the fastest propagating modes in said multimode fiber.

10. An optical fiber mode converter comprising first and second adjacent sections of optical fiber connected at a junction, the longitudinal axes of said sections being angularly and laterally offset at said junction.

11. A mode converter in accordance with claim 10 wherein said sections are part of the same optical fiber.

12. A mode converter in accordance with claim 10 wherein said first and second sections are different types of optical fibers, whereby said second section is capable of propagating a different number of modes than said first section.

13. An optical fiber mode converter in accordance with claim 10 wherein the angular offset between said fiber sections at said junction is about 3°.

14. A mode converter in accordance with claim 10 wherein said first and second sections are different optical fibers, the physical characteristics of said first optical fiber being sufficiently different from those of said second optical fiber that said second section is capable of propagating a different number of modes than said first section.

15. A mode converter in accordance with claim 14 wherein said first and second sections are optical fibers having different diameters.

16. A mode converter in accordance with claim 15 wherein said first and second sections are joined by a tapered section, said junction being located at said tapered section.

17. A method of making an optical fiber mode converter comprising
   providing an optical fiber comprising first and second adjacent sections, said second section being a multimode fiber,
   heating the junction between said two adjacent sections, and
   bending said fiber sections at said junction so that the longitudinal axis of said first fiber section is angularly and laterally offset with respect to the longitudinal axis of said second fiber section, the extent of the angular and lateral offsets between the longitudinal axes of said sections being such that the lowest order mode received by said first section is redistributed as a plurality of modes which propagate through said second section at different velocities.

18. A method in accordance with claim 17 further comprising the steps of connecting a source of light pulses to one of said fiber sections and monitoring the light pulses emitted from the remaining fiber section, the step of bending being continued until the step of monitoring reveals that the power levels of at least two modes propagating in one of said fiber sections are at a predetermined ratio.

19. A method in accordance with claim 17 wherein the step of heating comprises disposing said junction between first and second electrodes and passing an electrical arc therebetween, and the step of bending comprises laterally offsetting one of said fiber sections with respect to the other of said sections and moving said two fiber sections until said junction contacts said first electrode and thereafter bending said fiber sections about said first electrode.

20. A method in accordance with claim 17 wherein the step of bending comprises disposing said junction between a template having a shaped surface and a plunger, and engaging said junction by said plunger to cause said two adjacent sections to adopt a shape dictated by said shaped surface.

21. A method in accordance with claim 17 wherein said first and second fiber sections comprise two different fibers, said method further comprising the steps of fusing an end of said first fiber to an end of said second fiber, connecting a source of light pulses to the remaining end of one of said fibers to initiate therein the propagation of the LP01 mode, connecting a detector to the remaining end of the other of said fibers to monitor the light pulses emitted therefrom, aligning the longitudinal axes of said fibers until the power of the LP01 mode received by said detector is peaked, the steps of heating and bending comprising laterally moving one of said fibers with respect to the other until there is observed at said detector a first pulse due to the reception of the LP01 mode and a second pulse due to the reception of a mode of higher order than the LP0I mode, moving said two fiber sections until said junction contacts said first electrode and thereafter bending said fiber sections about said first electrode until the angle between the longitudinal axes of said fibers is such that the amplitude of said second pulse is a predetermined fraction of the amplitude of said first pulse.

22. An optical fiber transmission system comprising the serial arrangement of the following components
an optical pulse generator,
optical receiving means,
at least one single-mode optical transmission fiber connected between said pulse generator and said receiving means, and
a bandwidth limiter connected between said at least one single-mode optical transmission fiber and said potical receiving means,
said bandwidth limiter being characterized in that it comprises a multimode optical fiber and an input optical fiber which is shorter than said multimode fiber, one end of said input fiber being connected to said multimode fiber, first transition means being located at the junction of said input and multimode fibers for converting energy propagating in said input fiber to a plurality of modes which is greater in number than the number of modes propagating in said input fiber, said plurality of modes propagating through said multimode fiber at different velocities, said multimode and input fibers being laterally and angularly offset with respect to each other at the junction therebetween, means connecting the remaining end of said input fiber to one of said serial arrangement components, and means connecting the remaining end of said multimode fiber to the next mentioned component in said serial arrangement, whereby the reception by said input fiber of a given pulse of light energy having a given time duration width results in the arrival at said next mentioned component of a light pulse having a width greater than said given width.

23. A system in accordance with claim 22 wherein said multimode fiber is a two mode fiber.

24. A system in accordance with claim 22 wherein said multimode fiber is a step index fiber.

25. A system in accordance with claim 22 wherein said multimode fiber comprises at least two annularly spaced, light propagating regions.

26. A system in accordance with claim 22 wherein said connecting means comprises an output optical fiber, means connecting said output optical fiber to said receiving means, and second transition means located at the junction of said output and multimode fibers for converting to the lowest order mode at least a portion of the power propagating in said multimode fiber in modes higher than the lowest order mode.

27. An optical fiber mode converter comprising first and second adjacent sections of optical fiber connected at a junction, the longitudinal axes of said sections being angularly and laterally offset at said junction, said junction having been formed by subjecting the ends of said fiber sections to sufficient heat to cause them to soften, whereby said fiber sections are substantially stress-free at said junction.

28. A mode converter in accordance with claim 27 wherein said first and second sections are different optical fibers, the physical characteristics of said first optical fiber being sufficiently different from those of said second optical fiber that said second section is capable of propagating a different number of modes than said first section.

29. A mode converter in accordance with claim 28 wherein said first and second sections are optical fibers having different diameters.

30. A mode converter in accordance with claim 29 wherein said first and second sections are joined by a tapered section, said junction being located at said tapered section.

31. An optical fiber mode converter in accordance with claim 33 wherein the angular offset between said fiber sections at said junction is about 3°.

32. An optical fiber mode converter comprising first and second adjacent sections of optical fiber connected at a junction, the longitudinal axes of said sections being angularly and laterally offset at said junction, said fiber sections being substantially stress-free said junction, whereby mode conversion is caused by the lateral and angular offsets of said fibers and is independent of any stress-induced effect.

33. A mode converter in accordance with claim 32 wherein said first and second sections are different optical fibers, the physical characteristics of said first optical fiber being sufficiently different from those of said second optical fiber that said second section is capable of propagating a different number of modes than said first section.

34. A mode converter in accordance with claim 33 wherein said first and second sections are optical fibers having different diameters.

35. A mode converter in accordance with claim 34 wherein said first and second sections are joined by a tapered section, said junction being located at said tapered section.

36. An optical fiber mode converter in accordance with claim 32 wherein the angular offset between said fiber sections at said junction is about 3°.

37. An optical fiber transmission system comprising the serial arrangement of the following components
an optical pulse generator,
optical receiving means,
a plurality of single-mode optical transmission fibers connected between said pulse generator and said receiving means, and
a bandwidth limiter connected between two of said plurality of single-mode optical transmission fibers,
said bandwidth limiter being characterized in that it comprises a multimode optical fiber and an input optical fiber which is shorter than said multimode fiber, one end of said input fiber being connected to said multimode fiber, first transition means being located at the junction of said input and multimode fibers for converting energy propagating in said input fiber to a plurality of modes which is greater in number than the number of modes propagating in said input fiber, said plurality of modes propagating through said multimode fiber at different velocities, said multimode and input fibers being laterally and angularly offset with respect to each other at the junction therebetween, means connecting the remaining end of said input fiber to one of said serial arrangement components, and means connecting the remaining end of said multimode fiber to the next mentioned component in said serial arrangement, whereby the reception by said input fiber of a given pulse of light energy having a given time duration width results in the arrival at said next mentioned component of a light pulse having a width greater than said given width.

* * * * *